UNITED STATES PATENT OFFICE.

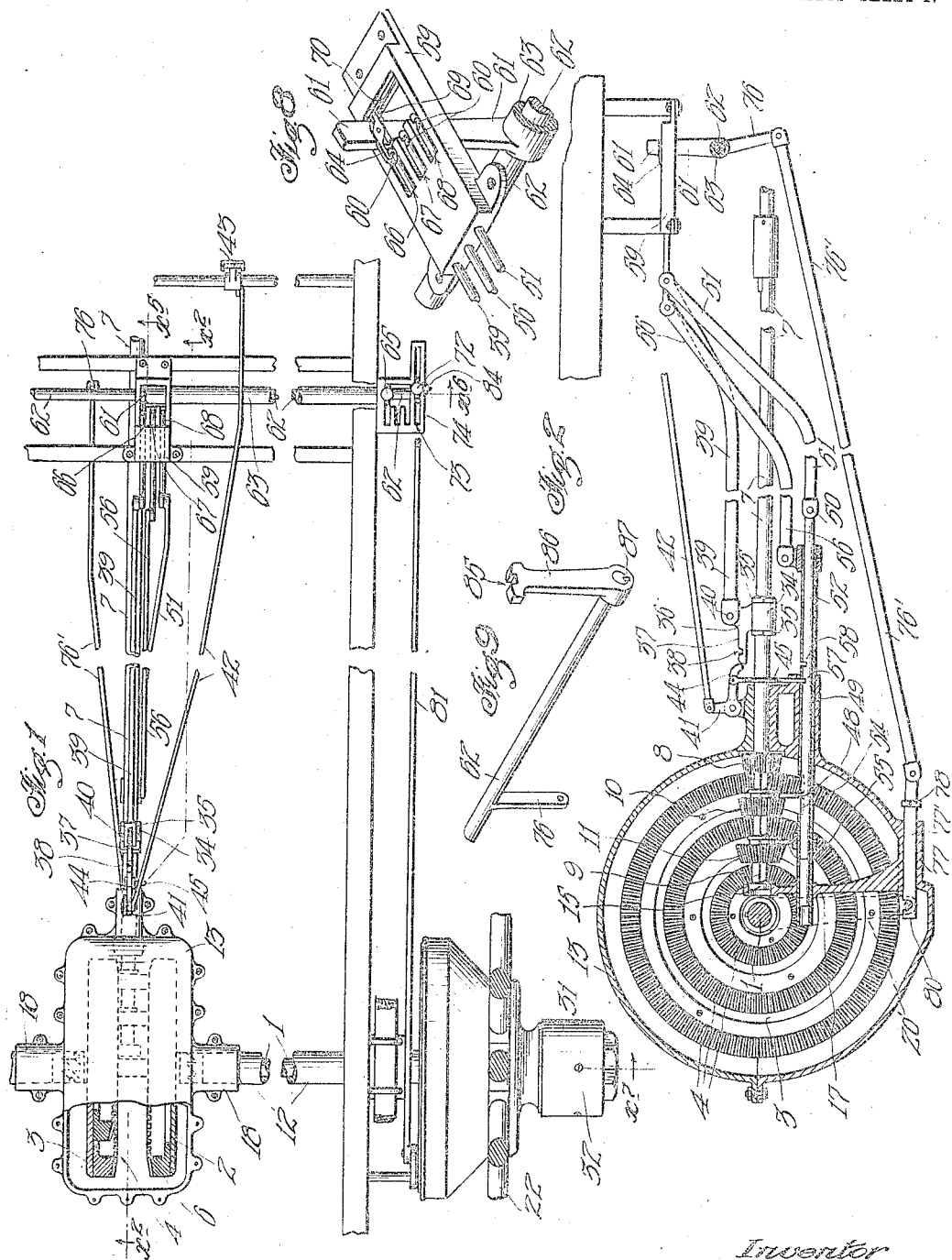

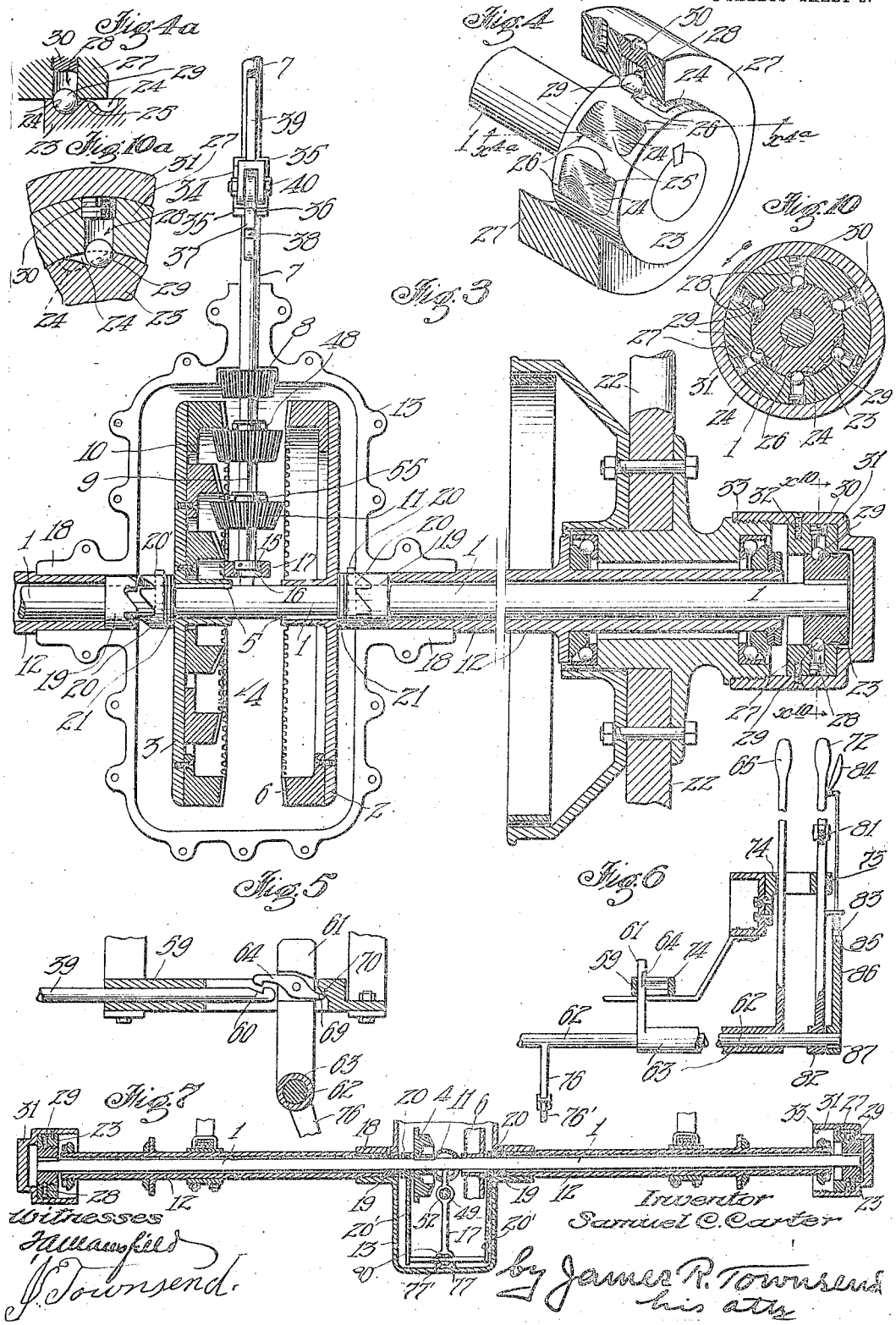

SAMUEL C. CARTER, OF LOS ANGELES, CALIFORNIA, ASSIGNOR OF ONE-THIRD TO CARLISLE H. ESLER, OF LOS ANGELES, CALIFORNIA.

TRANSMISSION MECHANISM.

No. 875,321.   Specification of Letters Patent.   Patented Dec. 31, 1907.

Application filed August 14, 1906. Serial No. 330,615.

*To all whom it may concern:*

Be it known that I, SAMUEL C. CARTER, a citizen of the United States, residing at Los Angeles, in the county of Los Angeles and State of California, have invented a new and useful Transmission Mechanism, of which the following is a specification.

Objects of this invention are:—to provide for automobiles and the like, a satisfactory direct drive transmission which has few parts, may be readily thrown into and out of gear, and changed to and from high, intermediate, and low speed with great ease and convenience; and to apply the power from the driving shaft to the driving wheels of the machine through practically differential means of very simple construction to prevent slipping of the wheels in turning corners.

Another object is to provide an automobile having differential driving wheels with a solid axle connecting such wheels, thereby avoiding the usual weakening of the rear axle caused by dividing the same for differential motion.

The accompanying drawings illustrate the invention:—

Figure 1 is a fragmental plan of the invention as applied in an automobile, a fragment of one of the driving wheels being shown, it being understood that the driving wheels are duplicates. Some of the parts are broken and partly shown in section. Fig. 2 is a sectional elevation on line $x^2$ $x^2$, Fig. 1, on a somewhat larger scale. Fig. 3 is an enlarged broken plan sectional detail illustrating the power transmission and differential devices therefor. Fig. 4 is a perspective detail illustrating the differential connection between the shaft and the hub of the wheel. Fig. 4$^a$ is a fragmental section through line $x^{4a}$—$x^{4a}$, Fig. 4. Fig. 5 is a fragmental sectional detail of the lever connections for operating the gears, on line $x^5$, Fig. 1. Fig. 6 is an elevation of the same on line $x^6$, Fig. 1. Fig. 7 is a longitudinal sectional elevation of wheel shaft, on line $x^7$, Fig. 1, on reduced scale. Fig. 8 is a fragmentary perspective of gear controller. Fig. 9 is a fragmentary perspective of driven shaft controlling reverse of machine. Fig. 10 is a section on line $x^{10}$—$x^{10}$, Fig. 3. Fig. 10$^a$ is an enlarged detail of a fragment of Fig. 10.

1 designates a driven shaft having rotatably fixed thereon a plurality of disks 2 and 3 which are fixed with respect to the driven shaft 1. The disk 3 is provided with concentric gear faces 4, three in number, of varying diameters, as is apparent from the sectional illustration in Fig. 3. The disks are fixed on to the shaft by means of a key 5, or any other means.

The disk 2 is provided with a single gear face 6 which is fixed to the outer periphery thereof and is used to reverse the machine. Coacting with said driven shaft is a driving shaft 7 which is connected with the prime mover, and which is extensible for the purpose of compensating for variations in the axial alinement of the shaft and which is likewise extensible during the rotation thereof.

A pinion or bevel gear 8 is integrally united with said driving shaft 7. The lower part 9 of said shaft 7 is squared to accommodate a plurality of gears 10 and 11 of varying sizes which are slidable on the lower part of said shaft and adapted to be thrown into mesh with the concentric gear faces 4 of the disk 3, thus variably transmitting power from it to the driven shaft and subsequently to the wheels.

The shaft 1 is enveloped by a casing 12, and the train of gears above described is inclosed in a gear case or housing 13 rigidly secured to the casing 12 of the shaft 1 as well as to a part of the vehicle.

The extreme end of the driving shaft 7 is provided with a collar 15 and operates in the bearing 16 formed by a support 17 which extends upwardly within the gear case and is made a part thereof.

The casing 12 enveloping the shaft 1 does not extend entirely through said gear case 13, but is broken off in the hub 18 thereof to accommodate a toothed collar 19 which is secured to the hub 18 but which is loose upon the shaft 1. This toothed collar 19 is engaged by a similar toothed collar 20 loosely mounted upon the shaft and adapted to remain stationary during the revolution of the driven shaft, and whose function is to force said clutch collar 19 out of engagement with the collar 20, whereby the entire shaft 1 is moved in either one direction or the other depending entirely upon the operation of the collars from one or the other side. These collars are controlled by suitable levers such as shown at 20'.

Between the outer faces of said disks and the inner faces of said toothed collar 20 is a ball thrust bearing 21 designed to offset and take up the wear incident to the operation of the toothed members against the disk surfaces.

Wheels 22 are mounted upon the casing of said driven shaft, and the operation of the wheels is determined by a drum 23 rigidly fixed on to the extremity of the shaft 1 and provided with duplicate pockets 24, the concavities of which are formed by a centrally and angularly-extending undulation or ridge 25 centrally dividing the pockets. These pockets terminate in abrupt walls or noses 26 on oppositely-disposed sides.

A collar 27 surrounds said drum and is provided with peripheral orifices 28 extending centrally therethrough. Each orifice 28 is arranged to accommodate a ball 29 which is interposed between said drum and collar and acts to lock the collar on said drum when the shaft has been shifted to a position which will allow the ball to abut against the abrupt wall formed by the pocket.

If the ball is shifted to the opposite side a reversal of the wheels is effected. If, however, the ball is allowed to ride upon the ridge 25 the wheels are free to revolve independently of the machine or the motive power of the engine. This ball is held in place in its respective orifice by means of a small screw 30 forming a cap and partially closing the orifice 28 in order to allow the ball to rise and fall as the shaft is shifted.

A hub casing or shell 31 is likewise secured to said collar 27 by means of a screw 32, and this shell is screwed on to the hub of the wheel, as shown at 33, whereby the motion from the shaft is transmitted to the wheels of the vehicle. Thus, as the balls in the pockets are caused to change their positions from one pocket to the other they engage the oppositely-disposed walls formed by the pockets, and thus engaging, lock the collar together with the casing or shell 31, allowing the shaft to rotate either forwardly or backwardly according to the position of the balls. In this manner rotary motion is imparted to the wheels directly from the drum through the medium of the driven shaft. This construction enables one wheel to travel faster than the other when making turns, thus avoiding what is commonly known as "skidding" of the inner wheel. The outer wheel, in describing the arc of a circle, of necessity travels with greater velocity than the inner wheel. To compensate for this variation in the degrees of revolution, I have devised this method of locking the wheels in such manner upon the drum which is fastened to the axle, that as the turn is made, the outer wheel—describing the greater radius of a circle,—may travel considerably faster than the shaft upon which it is mounted. If, for instance the inner wheel is revolving at say 250 revolutions per minute, the outer wheel will revolve at a speed greater than that of the inner wheel, though the axle and the inner wheel are revolving in harmony with the prime mover.

The operation is accomplished in substantially the following manner:—The drum is keyed to the driven shaft with which it revolves. The collar to which the wheel is secured surrounds the drum, and when in its operative position the ball locks the collar against the drum, thus revolving it with the axle. In a straight line the wheels revolve at equal speeds, but when a turn is made the outer wheel, which is bound to cover a greater amount of space,—together with the collar surrounding the drum,—automatically releases itself from the lock inasmuch as the proportionately increased speed of the wheel to that of the shaft carries the collar around the drum faster than the drum itself is revolving; at the same time causing the ball to travel forwardly and out of its pocket, and to ascend in the orifice in the collar, thus permitting of a variation in the velocities of the drum and the collar. When the turn has been completed and the necessity of a more speedy revolution of the outer wheel than that of the inner wheel, is dispensed with, the ball falling back into its normal position; viz.,—in the pocket, and abutting against the wall formed by the pocket,—again locks the collar on to the drum and the revolving shaft, and equalizes the speed between the two wheels. This is automatically accomplished, as is evident. To operate the driving shaft 7 I provide a sleeve 34 situated between two rigid collars or rings 35 made fast with said shaft and rotating therewith. This sleeve has an extension 36 and a finger 37 provided with a notch 38. A rod 39 is pivoted on to said extension 36, as shown at 40.

On to the upper end of the gear casing is a pivot dog 41 having attached thereto a rod 42 extending to the foot of the operator in the body of the vehicle, as shown at 43. One part of said dog is curved, as seen at 44, and provided with a link 45. Said link 45 extends downwardly and engages a notch 57 provided in the sleeve 52 and rod 49, which notch is intended to lock the rod against movement. The rod is likewise provided with another notch 58, which is adapted to receive the link 45 pivotally attached to the dog 44. This notch 58 acts as a lock when the dog 44 has been operated or raised to engage the notch 38 provided in the finger 37 of the sleeve 34 and prevents the accidental disengagement of the pinions.

In order to operate the driving shaft the operating lever 43 is pressed down, which in turn raises the part of the dog 41. Thereupon the arm 39 is operated, and it in turn forces back the shaft 7 until the extremity of the dog 41 engages the notch 38 in the finger of the extension formed on the sleeve 34.

To operate the bevel pinion 10 mounted on the shaft, I provide a finger 48 which is integral with a rod 49, and which rod in turn is pivoted at 50 to an arm 51 controllable by the operator of the machine. Similar means comprising a sleeve 52 surrounding said rod 49, are employed for operating the pinion 11. This sleeve is provided with an opening, seen at 54, to allow the finger 48 to escape, and to allow of the unimpeded movement of the sleeve 52 over the rod 49. The finger 55 is attached to the sleeve 52 and is operable by the arm 56 which also extends within reach of the operator of the machine.

All of the arms 39, 56 and 51 extend forwardly of the machine and through a block 59. They are each provided with an offset 60. An arm 61 slidably mounted on a shaft 62 is integrally united with a sleeve 63 which encircles said shaft 62, has attached to it pivotally a rabbeted pawl 64 which is adapted to engage the offset 60 provided in the respective ends of the various arms. This pawl is designed primarily to withdraw the arms from their operative positions.

The arm 61 is slidably mounted upon the shaft 62 for the purpose of allowing a lateral movement thereof for engaging the other levers extending through the block 59. The extreme end of the sleeve is provided with a lever 65 which operates all of the arms respectively.

The block is provided with guide-ways 66, 67, and 68 into which the arm 61 slides in the act of operating the arms 39, 51 and 56. The gravity pawl has a rearward extension 69 operating against an incline 70. This incline serves to hold the pawl out of engagement with the offset 60 provided in the levers. As soon, however, as the arm 61 is operated and the pawl allowed to swing on its pivot 71, it falls into engagement with said offset 60, and upon the reverse movement of said arm by means of the lever 65, withdraws the lever out of its operative position.

To the shaft 62 is attached a lever 72, which lever operates in the guide 73 provided in block 74.

The shaft 62 is provided with an arm 76 integrally fixed thereto and designed to operate the reverse of the machine by operating the clutch collars 19 and 20. The arm has pivotally attached to it a rod 76', the rear end of which rod is pivoted to a sliding member 77'. Said member is mounted in the bottom of the gear casing or housing 13 in a sleeve 77, and its movement is limited by a collar 78. It is intended to slide therein and operates the yoke 20' on to the ends of which the clutch collars 20 are mounted.

The member 77' has a U-shaped notch 80 which encircles the bottom portion of the yoke 20' for the purpose of permitting the lateral movement of the yoke and clutch collars. This lateral movement is accomplished, as will be seen, by the operation of the lever 72 which in the act of shifting the clutch members, shifts also the rotating axle, which operation controls the reverse of the machine.

On to the same lever 72 is attached a connection or rod 81 for actuating the brake independently of the reverse. In Fig. 6 of the drawing this is clearly shown. The lever 72 is loosely mounted upon the shaft 62, as seen at 82, and has provided thereon a spring-actuated dog 83 mounted thereupon and controlled by the member 84. This dog 83 is intended to engage a notch 85 provided in an arm 86. This arm 86 is keyed upon the shaft, as shown at 87.

To actuate the brake, the member 84 is manipulated so as to withdraw it from the notch 85 in the arm 86, whereupon it is free to revolve upon the shaft 62. On the other hand to operate the reverse it is but necessary to throw the lever forward which in turn operates to impart motion to the link and subsequently to the yoke 20' which disengages the clutch collars 19 and 20 from one side and causes an engagement of the same in the opposite side.

What I claim is:—

1. The combination with a driving shaft of a plurality of gears shiftably mounted thereon, a housing for said gears, means for shifting said gears with respect to said driving shaft, a driven shaft, wheels on said driven shaft, gears mounted on said driven shaft, and means for shifting said gears and said driven shaft for causing a variable rotation of said wheels.

2. A driving shaft, a driven shaft, disks mounted on said driven shaft having gear faces of varying diameters, means for moving said disks and said driven shaft, wheels on said driven shaft, gears on said driving shaft and means for moving said gears into and out of engagement with said gear faces on said driven shaft.

3. The combination with a driving and a driven shaft, of gears of varying sizes; means for shifting the gears on one of said shafts, means for moving said driving shaft independently of said gears, for causing a varying rotation of the driven shaft.

4. The combination with a driving shaft and a plurality of gear wheels mounted upon said shaft, of a driven shaft, wheels on said driven shaft, disks mounted thereon slidable with said shaft and provided with gear faces; means for throwing the gears on said driving shaft into engagement with the gear faces on said driven shaft, and means for controlling the rotation of the wheels mounted on said driven shaft.

5. A driving shaft, a plurality of gears thereon, a driven shaft wheels on said driven shaft disks thereon provided with gear faces, a housing for the gears of both shafts, toothed collars mounted on opposite sides of said disks, means for throwing the toothed collars into and out of engagement with each other, and ball clutches carried by said driven shaft arranged to impart motion to the wheels.

6. A driving shaft, bevel pinions longitudinally slidable mounted thereon, a driven shaft, disks provided with gear faces mounted thereon, means for throwing said bevel pinions into and out of engagement with said gear faces, wheels loose on said driven shaft, means on said driven shaft for causing the rotation of said wheels, and means for controlling said means.

7. An extensible driving shaft, a support therefor, gears shiftable on said driving shaft, a driven shaft disks thereon provided with gear faces arranged in operable relation to the driving shaft, means for shifting said disks, wheels on said driven shaft, and means controllable by said means for connecting the wheels to the driven shaft.

8. A driving shaft, a driven shaft, variable speed transmission gearing on said shafts and means for controlling said gearing, wheels having hubs loose on said driven shaft, drums keyed to said driven shaft, collars secured to said hubs and surrounding said drums, and means carried by said drums for clutching said collars and rotating said wheels.

9. A driving shaft bevel gears thereon shiftable with respect thereto, a driven shaft, disks fixedly mounted thereon having gear faces, means for connecting and disconnecting said bevel gears with said gear faces, means for shifting said disks and said driven shaft, wheels loose on said driven shaft, and means for transmitting motion to said wheels from said shaft.

10. A driving shaft, bevel pinions of varying sizes slidably arranged thereon, means for sliding said pinions on said shaft, a driven shaft, disks rigidly fixed on said driven shaft having gear faces, and means for throwing said pinions into and out of mesh with said gear faces for producing a variable rotation of said shaft, wheels having hubs loose on said driven shaft, drums fixed to said shaft, collars secured to said hubs and surrounding said drums, and means interposed between said drums and collars for clutching said wheels and causing a rotation thereof.

11. A driving shaft, a driven shaft, means intermediate said driving and said driven shaft for causing a variable rotation of said driven shaft, wheels having hubs loose on said driven shaft, drums keyed to said driven shaft, collars secured to said hubs and surrounding said drums, interposed means for locking said collars on said drums and causing a rotation of said wheels, and means for shifting said driven shaft for causing said collars to lock on said drums and rotate said wheels.

12. An extensible driving shaft, a fixed pinion and a plurality of slidable pinions of varying sizes mounted thereon, means for extending said shaft while in motion, means for sliding said pinions, a driven shaft, disks fixed on said shaft having gear faces of varying diameters, wheels having hubs, on said driven shaft, drums keyed to said driven shaft having oppositely-disposed concaved pockets, collars secured to said hubs and surrounding said drums, interposed means for locking said collars onto said drums, and means for bodily shifting said driven shaft to cause said gear faces to mesh with said pinions.

13. A driving shaft, a fixed pinion and a plurality of movable pinions of varying sizes mounted thereon, means for moving said movable pinions longitudinally with respect to said driving shaft, means for bodily shifting said shaft during rotation, a driven shaft, disks on said driven shaft, one of which is provided with concentric gear faces and the other of which is provided with a single gear face, wheels on said driven shaft having hub, drums fixed to said shaft, collars secured to said hubs and surrounding said drums, interposed means for locking said collars on said drums, and means for shifting said driven shaft bodily whereby the wheels are clutched.

14. The combination with a driving shaft and a driven shaft of variable speed transmission gearing mounted in operable relation to said shafts, means for controlling said gearing; wheels on said driven shaft, and means controllable by the lateral shifting of said driven shaft, for transmitting power to the wheels in either a forward or reverse direction.

15. The combination with a driving shaft and a driven shaft, of variable speed transmission gearing mounted in operable relation with respect to said shafts, means for controlling said gearing, wheels mounted upon said driven shaft, means for causing said driven shaft to clutch said wheels only when the speed of the wheels is equal to the speed of said driven shaft, and means for shifting said driven shaft to control said last-named means.

16. In combination with a driving shaft and a driven driven shaft, of variable speed transmission gearing mounted intermediate said driving shaft and said driven shaft, wheels on said driven shaft, means carried by said driven shaft for causing said wheels to clutch in either a forward or rearward direction and means for controlling said gearing whereby said clutch means is also controlled.

17. The combination with a driving shaft and a driven shaft, of variable speed transmission gearing mounted intermediate said driving shaft and said driven shaft; means for shifting said gearing, wheels having hubs on said driven shaft, drums fixed thereto, collars secured to said hubs and surrounding said drums, balls interposed between said drums and collars, said balls being adapted to clutch said collars and rotate said wheels.

18. A driving shaft, gears of varying sizes mounted thereon, a driven shaft, disks on said driven shaft provided with gear faces and arranged to be thrown into and out of mesh with said gears, a pair of wheels having hubs, drums on said driven shaft, collars secured to said hubs and surrounding said drums, interposed means for clutching said collars on said drums, means for bodily shifting said driven shaft to actuate said clutching means, brake mechanism, means for controlling said brake mechanism whereby the brake is applied in one direction, and the reversal of the machine effected in the other direction.

19. A driving shaft, a fixed gear and movable gears mounted thereon, means for controlling said movable gears, a driven shaft, wheels having hubs on said driven shaft, disks mounted on said shaft and arranged to rotate therewith, one of said disks having gear faces of varying diameters and the other having a single gear; drums fixed to said driven shaft having peripheral pockets, collars secured to said hubs and surrounding said drums, balls interposed between said drums and collars, means for retaining said balls in said pockets for clutching said collars and revolving said wheels, and means for bodily shifting said driven shaft.

20. A driving shaft, a driven shaft, variable speed transmission gearing mounted intermediate said shafts and means for controlling said gearing, wheels on said driven shaft, means carried by said driven shaft and operable by the lateral movement of said shaft for clutching said wheels, and means for controlling said lateral movement.

21. A driving shaft, a driven shaft, variable speed transmission gearing mounted intermediate said driving shaft and said driven shaft, means for controlling said gearing, wheels having hubs on said driven shaft, drums keyed to said shaft having diagonally-disposed pockets, collars secured to said hubs and surrounding said drums, balls interposed between said drums and collars and arranged to sit in said pockets, means controllable by the movement of said driven shaft for causing said balls to change from one pocket to another whereby to impart a forward or rearward rotation to the wheels, means for controlling the movement of said shaft, and connections between said collars and wheels.

22. A driving shaft, a driven shaft, variable speed transmission gearing mounted intermediate said driving shaft and said driven shaft, a plurality of rods for controlling said gearing, a terminal block for said rods having guide-ways; a lever for operating said rods, having means for positively engaging said arms in but one direction, said lever being slidably mounted and arranged to travel in said guide-ways in the operation of said arms; wheels having hubs on said driven shaft, drums keyed to said shaft having diagonally-disposed pockets, collars secured to said hubs and surrounding said drums, balls interposed between said drums and collars and arranged to sit in said pockets, means controllable by the movement of said driven shaft for causing said balls to change from one pocket to another whereby to impart a forward or rearward rotation to the wheels, collars fixed with respect to said driven shaft, collars loosely mounted on said driven shaft, and means for causing the engagement and disengagement of said collars.

23. The combination with a driving shaft and a driven shaft, transmission means in operable relation to said shafts capable of being shifted, of wheels loosely mounted on said driven shaft and means for clutching said wheels on said driven shaft, said means being controllable by the shifting of said driven shaft.

24. The combination with a driving shaft and a driven shaft capable of being shifted, transmission means in operable relation to said shafts, wheels loose on said driven shaft and means carried by and controllable by the shifting of said driven shaft, for clutching said wheels in a forward or rearward direction.

25. A driving shaft, a driven shaft, means for transmitting power from said driving shaft to said driven shaft, wheels on said driven shaft, means for locking said wheels on said driven shaft in a forward or rearward direction, and means for shifting said driven shaft to control said means.

26. A driving shaft, a driven shaft, variable speed transmission gearing mounted intermediate said driving shaft and said driven shaft, means for controlling said gearing, wheels having hubs on said driven shaft, drums keyed to said shaft having oppositely-disposed peripheral pockets separated by diagonal ridges, collars secured to said hubs surrounding said drums, balls interposed between said drums and collars and arranged to sit in said pockets, and means for causing said balls to shift from one pocket to another, whereby the direction of travel of the wheels is controlled.

27. A driving shaft, a driven shaft, transmission gears interposed in operable relation to said shafts, drums on said driven shaft, provided with reversely disposed pockets, wheels on said drums, means carried by said pockets for locking said wheels on said drums in a forward or rearward direction, and means for laterally shifting said driven shaft to control said first-named means.

28. A driving shaft, a driven shaft, drums on said driven shaft, variable speed transmission gearing mounted intermediate said driving shaft and said driven shaft and means for controlling said gearing, wheels loose on said drums, interposed means for locking said drums on said wheels to cause a forward or rearward rotation thereof, said means being controllable by said first-named means.

29. A driving shaft, a driven shaft, drums keyed to said driven shaft, transmission means mounted intermediate said driving shaft and said driven shaft, and means for controlling said means, wheels loose on said drums, and means for locking said wheels on said drums in either a forward or rearward direction only when the speeds of the two wheels are equal, said means being controllable by said means for controlling said transmission means.

30. A driving shaft, a driven shaft, drums on said driven shaft, variable speed transmission gearing mounted intermediate said driving shaft and said driven shaft, and means for controlling said gearing, wheels on said drums, means for locking said wheels on said drums in either forward or rearward direction whereby said wheels travel in harmony with the driven shaft except when one of said wheels describes an arc of greater length than the other wheel, said means being controllable by said first-named means.

31. A driving shaft, a driven shaft, drums on said driven shaft having duplicate pockets, variable speed transmission gearing mounted intermediate said driving shaft and said driven shaft and means for controlling said gearing, wheels loose on said drums, and means carried by one of said duplicate pockets for locking said wheels on said drums, in either a forward or rearward direction, and means for controlling said means.

32. A driving shaft, a driven shaft, drums on said driven shaft having pockets, variable speed transmission gearing mounted intermediate said driving shaft and said driven shaft, and means for controlling said gearing, wheels on said drums, means loose in said pockets for locking said wheels on said drums, said means being controllable by said first-named means.

33. A driving shaft, a driven shaft, drums on said driven shaft having pockets, variable speed transmission gearing mounted intermediate said driving shaft and said driven shaft, and means for controlling said gearing, wheels on said drums, and means loose in said pockets for locking said wheels on said drums in either a forward or a rearward direction.

34. A driving shaft, a driven shaft, drums on said driven shaft having peripheral pockets separated by diagonal ridges, variable speed transmission gearing mounted intermediate said driving shaft and said driven shaft and means for controlling said gearing, wheels on said drums, means in said pockets for locking said wheels on said drums only when the speed of the wheels is equal to the speed of the driven shaft.

35. A driving shaft, a driven shaft, drums on said driven shaft having peripheral pockets separated by diagonal ridges, variable speed transmission gearing mounted intermediate said driving shaft and said driven shaft and means for controlling said gearing, wheels on said drums and means in said pockets for locking said wheels on said drums whereby the wheels are positively locked when the speed of the wheels is equal to the speed of the driven shaft, but unlocked when such speed varies.

36. A driving shaft, a driven shaft, drums on said driven shaft provided with peripheral pockets separated by ridges intercepting diagonally the continuity of the pocket formation, each of said pockets having at its greatest depth a wall, transmission gearing mounted intermediate said driving shaft and said driven shaft, and means for controlling said gearing, wheels on said drums, and means carried by one of said pockets for locking said wheels on said drums in either a forward or rearward direction.

37. A driving shaft, a driven shaft, drums on said driven shaft having peripheral pockets separated by diagonal ridges, said pockets being of gradually increasing depth and terminating in an abrupt wall, variable speed transmission gearing mounted intermediate said driving shaft and said driven shaft, wheels on said drums having sockets, balls in said pockets engaging said sockets for locking said wheels on said drums, and means for controlling the position of the balls.

38. A driving shaft, a driven shaft, drums on said driven shaft having peripheral pockets separated by diagonal ridges, said pockets being of gradually increasing depth and terminating in an abrupt wall, variable speed transmission gearing mounted intermediate said driving shaft and said driven shaft, wheels on said drums having sockets, balls in said pockets engaging said sockets for locking said wheels on said drums, and means for shifting the balls from one pocket to the other.

39. A driving shaft, a driven shaft, drums on said driven shaft having peripheral pockets separated by diagonal ridges, said pockets being of gradually-increasing depth and terminating in an abrupt wall, variable speed transmission gearing mounted intermediate said driving shaft and said driven shaft, wheels on said drums, balls interposed between said drums and wheels and arranged to sit in said pockets whereby to lock said wheels on said drums and allow said wheels to travel at a greater speed than their rotating shaft, and means for causing said balls to shift from one pocket to another whereby to regulate the forward or rearward travel of the wheels.

40. A driving shaft and a driven shaft, transmission gears interposed between said driving shaft and said driven shaft, wheels on said driven shaft having hubs, drums keyed to said driven shaft, having pockets which are reversely disposed, collars secured to said hubs and surrounding said drums, and balls carried by said drums for clutching said collars and rotating said wheels.

41. A driving shaft and a driven shaft, transmission mechanism interposed between said driving shaft and said driven shaft, wheels loose on said driven shaft having hubs, drums on said driven shaft having two sets of pockets, collars secured to said hubs surrounding said drums, and means interposed between said drums and collars and loose in said pockets for clutching said wheels and causing a rotation thereof, and means for controlling said means.

42. A driving shaft and a driven shaft, means carried by said driving shaft for driving the driven shaft, wheels loose on said driven shaft, means for locking said wheels on said shaft, said means being controllable by the lateral shifting of said driven shaft.

43. A driving shaft, a driven shaft, variable speed transmission gearing mounted intermediate said driving shaft and said driven shaft, wheels on said driven shaft, interposed means for locking said wheels on said driven shaft, and means for bodily shifting said driven shaft whereby to control the locking of said wheels on said shaft.

44. The combination with a driving shaft, a driven shaft, variable speed transmission gearing mounted intermediate said driving shaft and said driven shaft and means for controlling said gearing, said driven shaft having wheels provided with hubs, of drums fixed thereto, collars secured to said hubs and surrounding said drums, and balls interposed between said drums and collars, said balls being adapted to clutch said collars and rotate said wheels in a forward or rearward direction, and means for controlling said balls.

45. The combination with a driving shaft and a driven shaft, in operative relation to said driving shaft of a pair of wheels on said driven shaft provided with hubs, drums on said driven shaft, collars secured to said hubs and surrounding said drums, interposed means for clutching said collars on said drums, and means for bodily shifting said driven shaft to control said clutch means.

46. The combination with a driving shaft and a driven shaft, and transmission mechanism intermediate said driving shaft and said driven shaft, of a pair of wheels on said driven shaft provided with hubs, drums on said driven shaft, collars secured to said hubs and surrounding said drums, interposed means for clutching said collars on said drums, means for bodily shifting said driven shaft to actuate said clutching means, brake mechanism and means for controlling said brake mechanism whereby the brake is applied in one direction and the reversal of the machine effected in the other direction.

47. The combination with a driving shaft, a driven shaft, and transmission mechanism intermediate said driving shaft and said driven shaft, wheels on said driven shaft having hubs, of drums fixed to said driven shaft having peripheral pockets, collars secured to said hubs and surrounding said drums, balls interposed between said drums and collars, means for retaining said balls in said pockets for clutching said collars and revolving said wheels, and means for controlling the position of the balls.

48. A driving shaft, a driven shaft, variable speed transmission mechanism mounted intermediate said driving shaft and said driven shaft, wheels on said driven shaft having hubs, drums fixed to said shaft, collars secured to said hubs and surrounding said drums, interposed means for locking said collars on said drums, and means for bodily shifting said driven shaft for controlling said locking means.

49. A driving shaft, a driven shaft, drums on said driven shaft having peripheral rows of pockets, wheels loose on said drums, and means carried by one of said rows of pockets for locking said wheels on said drums in a forward or rearward direction.

50. A driving shaft, a driven shaft, transmission means intermediate said driving shaft and said driven shaft, drums on said driven shaft having pockets, wheels on said drums, means loose in said pockets for locking said wheels on said drums in either a forward or a rearward direction, and means for controlling said means.

51. A driving shaft, a driven shaft, transmission means intermediate said driving shaft and said driven shaft, drums on said driven shaft having peripheral pockets separated by diagonal ridges, wheels on said drums and means in said pockets for locking said wheels on said drums only when the speed of the driven shafts is equal to the speed of the wheels.

52. A driving shaft, a driven shaft, transmission means intermediate said driving shaft and said driven shaft, drums on said driven shaft having peripheral pockets separated by diagonal ridges, wheels on said drums, and means in said pockets for locking said wheels on said drums whereby the wheels are positively locked when the speed of the wheels does not exceed the speed of the driven shaft, and automatically unlocked when such is greater.

53. A driving shaft, a driven shaft, transmission means intermediate said driving shaft and said driven shaft, drums on said driven shaft provided with peripheral pockets separated by ridges intercepting diagonally the continuity of the pocket formation, wheels on said drums, and means carried by one of said pockets for locking said wheels on said drums in either a forward or a rearward direction.

54. A driving shaft, a driven shaft, transmission gears intermediate said driving shaft and said driven shaft, and means for controlling said gears, drums on said driven shaft having peripheral pockets separated by diagonal ridges, said pockets being of gradually-increasing depth and terminating in an abrupt wall, wheels on said drums having sockets, balls in said pockets engaging said sockets for locking said wheels on said drums, and means for governing the position of the balls.

55. A driving shaft, a driven shaft, transmission gears intermediate said driving shaft and said driven shaft, and means for controlling said gears, drums on said driven shaft having peripheral pockets separated by diagonal ridges, wheels on said drums having sockets, balls in said pockets engaging said sockets for locking said wheels on said drums, and means for shifting the balls from one pocket to the other.

56. A driving shaft, a driven shaft, transmission gears intermediate said driving shaft and said driven shaft, and means for controlling said gears, drums on said driven shaft having pockets separated by diagonal ridges, wheels on said drums, balls interposed between said drums and wheels, and arranged to sit in said pockets for locking said wheels on said drums, and means for causing said balls to shift from one pocket to another whereby to regulate the forward or rearward travel of the wheels.

57. A driving shaft, a driven shaft, gears mounted on said driving shaft and in operable relation to said driven shaft for transmitting power thereto, and means for controlling said gears, drums on said driven shaft having two sets of pockets oppositely disposed and separated by a diagonal wall, wheels on said drums, balls engaging said pockets for locking said wheels on said drums, and means for shifting the driven shaft to control the position of said balls.

58. The combination with a driving shaft transmission mechanism mounted intermediate said driving shaft and said driven shaft, and a driven shaft, of wheels loose on said driven shaft, drums fixed on said driven shaft, collars surrounding said drums, means for connecting said collars with said drums for locking said wheels, means for shifting said drums relatively to said collars to control the forward or rearward movement of the wheels, and means for connecting said drums to said driven shaft.

59. The combination with a driving shaft transmission mechanism mounted intermediate said driving shaft and said driven shaft, and a driven shaft, of wheels loose on said driven shaft having hubs, drums fixed to said driven shaft, collars surrounding said drums, means carried by said drums and controllable by the movement of said driven shaft for connecting said drums with said collars, and means for connecting said collars with said wheels.

60. The combination with a driving shaft transmission mechanism mounted intermediate said driving shaft and said driven shaft, and a driven shaft, of wheels loose on said driven shaft, drums fixed on said driven shaft, collars surrounding said drums, dust-proof caps engaging the hubs of said wheels for connecting said collars with said wheels, and means for connecting said drums to said driven shaft.

61. The combination with a driving shaft transmission mechanism mounted intermediate said driving shaft and said driven shaft, and a driven shaft, of wheels loose on said driven shaft, drums fixed on said driven shaft provided with two sets of pockets, collars surrounding said drums, balls for connecting said collars with said drums, said balls being loosely seated in said pockets, means for controlling the position of said balls in one set of pockets or the other, and means for connecting said collars with the hubs of said wheels.

62. A driving shaft, transmission mechanism mounted intermediate said driving shaft and said driven shaft, a driven shaft, wheels on said driven shaft, means for causing said driven shaft to clutch said wheels when the speed of the wheels is equal to the speed of the driven shaft, brake mechanism, and means for controlling the brake mechanism whereby the brake is applied in one direction and the reversal of the machine effected in the other direction.

63. The combination with a driving shaft and a driven shaft, of variable speed transmission gearing mounted intermediate said driving shaft and said driven shaft, drums keyed to said driven shaft, said drums being provided with two rows of peripheral reversely-disposed pockets, collars surrounding said drums, said collars being provided with apertures, means carried by said pockets for locking said drums on said collars, and means for laterally shifting said driven shaft for causing said means to clutch said collar and rotate said wheels in either a forward or a rearward direction, said means for clutching said collars being arranged to move in said apertures upon the movement of said drums.

64. A driving shaft, a driven shaft, variable speed transmission gearing mounted intermediate said driving shaft and said driven shaft and means for controlling said gearing, wheels on said driven shaft having hubs, drums keyed to said shaft having diagonally-disposed pockets, collars secured to said hubs and surrounding said drums, said collars being provided with apertures, balls interposed between said drums and collars and arranged to sit in said pockets and engage said apertures, means for moving said driven shaft for causing said balls to change from one pocket to another, whereby to impart a forward or rearward rotation to the wheels, said balls being adapted to rise in the apertures provided in said collars, and connections between said collars and wheels.

65. A driving shaft, a driven shaft, wheels on said driven shaft having hubs, drums keyed to said driven shaft having peripheral pockets which are reversely disposed and separated by a diagonal ridge the apex of which is substantially central of the pockets, collars secured to said hubs and surrounding said drums, and means carried by said drums for clutching said collars and rotating said wheels.

In testimony whereof, I have hereunto set my hand at Los Angeles, California, this 7th day of August, 1906.

S. C. CARTER.

In presence of—
JAMES R. TOWNSEND,
ANTON GLOETZNER.